(12) United States Patent
Han et al.

(10) Patent No.: US 12,072,900 B2
(45) Date of Patent: Aug. 27, 2024

(54) ADDING A READ-ONLY QUERY ENGINE TO PERFORM QUERIES TO A POINT-IN-TIME OF A WRITE-ACCESSIBLE DATABASE

(71) Applicant: Amazon Technologies, Inc., Seattle, WA (US)

(72) Inventors: Changan Han, Kirkland, WA (US); Murali Brahmadesam, Tiruchirapplli (IN); Anupriya Mathur, Santa Clara, CA (US); Navaneetha Krishnan Thanka Nadar, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/159,035

(22) Filed: Jan. 24, 2023

(65) Prior Publication Data

US 2023/0281211 A1 Sep. 7, 2023

Related U.S. Application Data

(63) Continuation of application No. 16/777,741, filed on Jan. 30, 2020, now Pat. No. 11,573,969.

(51) Int. Cl.
*G06F 16/2458* (2019.01)
*G06F 16/2455* (2019.01)
*G06F 16/248* (2019.01)

(52) U.S. Cl.
CPC ...... *G06F 16/2474* (2019.01); *G06F 16/2455* (2019.01); *G06F 16/248* (2019.01)

(58) Field of Classification Search
CPC . G06F 16/2474; G06F 16/2455; G06F 16/248

USPC ......................................................... 707/769
See application file for complete search history.

(56) References Cited

U.S. PATENT DOCUMENTS

| | | | |
|---|---|---|---|
| 9,632,878 B1 * | 4/2017 | Maccanti | G06F 11/1469 |
| 9,633,051 B1 * | 4/2017 | Maccanti | G06F 11/1464 |
| 10,025,673 B1 * | 7/2018 | Maccanti | G06F 11/1451 |
| 11,573,969 B1 | 2/2023 | Han et al. | |
| 2007/0271242 A1 * | 11/2007 | Lindblad | G06F 16/24526 707/E17.127 |

OTHER PUBLICATIONS

Amazon, "Amazon Aurora User Guide for Aurora," https://docs.aws.amazon.com/AmazonRDS/latest/AuroraUserGuide/aurora-ug.pdf#CHAP_AuroraOverview, via the Wayback Machine 2020, pp. 1-1124.

* cited by examiner

*Primary Examiner* — Joshua Bullock
(74) *Attorney, Agent, or Firm* — S. Scott Foster; Kowert, Hood, Munyon, Rankin & Goetzel, P.C.

(57) ABSTRACT

A database system may add a read-only query engine to perform read-only queries associated with points-in-time of a database. In various embodiments, the read-only query engine may be added in response to a manual request, an automatic refresh of a network endpoint, a query specifying a point-in-time, or a connection request. The read-only query engine may perform the point-in-time queries on a version the database at the point-in-time and return results for the queries. Upon completion of the queries or at a determined time, the database system may remove the read-only query engine. The specified point-in-time may refer to a current time, a prior time, or a future time with respect to the current time.

20 Claims, 12 Drawing Sheets

ADDING A READ-ONLY QUERY ENGINE TO PERFORM QUERIES TO A POINT-IN-TIME OF A WRITE-ACCESSIBLE DATABASE

BACKGROUND

This application is a continuation of U.S. patent application Ser. No. 16/777,741, filed Jan. 30, 2020, which is hereby incorporated by reference herein in its entirety.

A database is a collection of data stored and accessed electronically from one or more storage devices. The database is generally administered by a database management system (DBMS), a software system that enables users to define, create, maintain and control access to the database. The sum total of the database, the DBMS and the associated applications can be referred to as a "database system". Through the DBMS, data of the database may be added (e.g., by a write or insert request), retrieved (e.g., by a read request, a read-only query, or a query), updated (e.g., by an update request), and/or deleted (e.g., by a delete request). Frequently, a user of a database may want to retrieve data at a specific point-in-time from the database. For example, the user may need financial data of a corporation in a certain quarter in order to prepare a business report. The user may need to restore multiple instances of a database, each representing a database environment at one point-in-time. If the database includes sharded data copies stored on storage resources spanning different zones and/or regions, there may be instances for the multiple shards across the zones/regions as well. However, an instance is generally a complete database environment including the DBMS software, table structure, stored procedures and other functionality. The instances may be prepared as a routine process regardless of whether or not there are actually read queries of the database directed to those anticipated points-in-time. Therefore, this can be an expensive, if not wasteful, usage of the database storage resources. In addition, to maintain the integrity of the database and consistency of the contained data, a DBMS may perform multiple requests that are received concurrently or near the same time in sequence. For instance, the DBMS may perform modifications (or transactions) to a database (e.g., write, update and/or delete) until after it completes the performance of reads of the database. The transactions such as writes to the database may be continuously received and recorded in a log (as a buffer) of the database. Until after the reads end, the transactions may be applied to the actual database. This way, the appropriate data, rather than later-updated data, may guarantee to be retrieved for the user. However, when there is a long queue of read-only queries, operations of the database can experience a significant delay. With an increase of the size and complexity of databases, such delays can begin to deteriorate and become a critical issue. Thus, it is desirable to have techniques to more efficiently implement read-only queries to provide a high-performance database.

Figure 1:
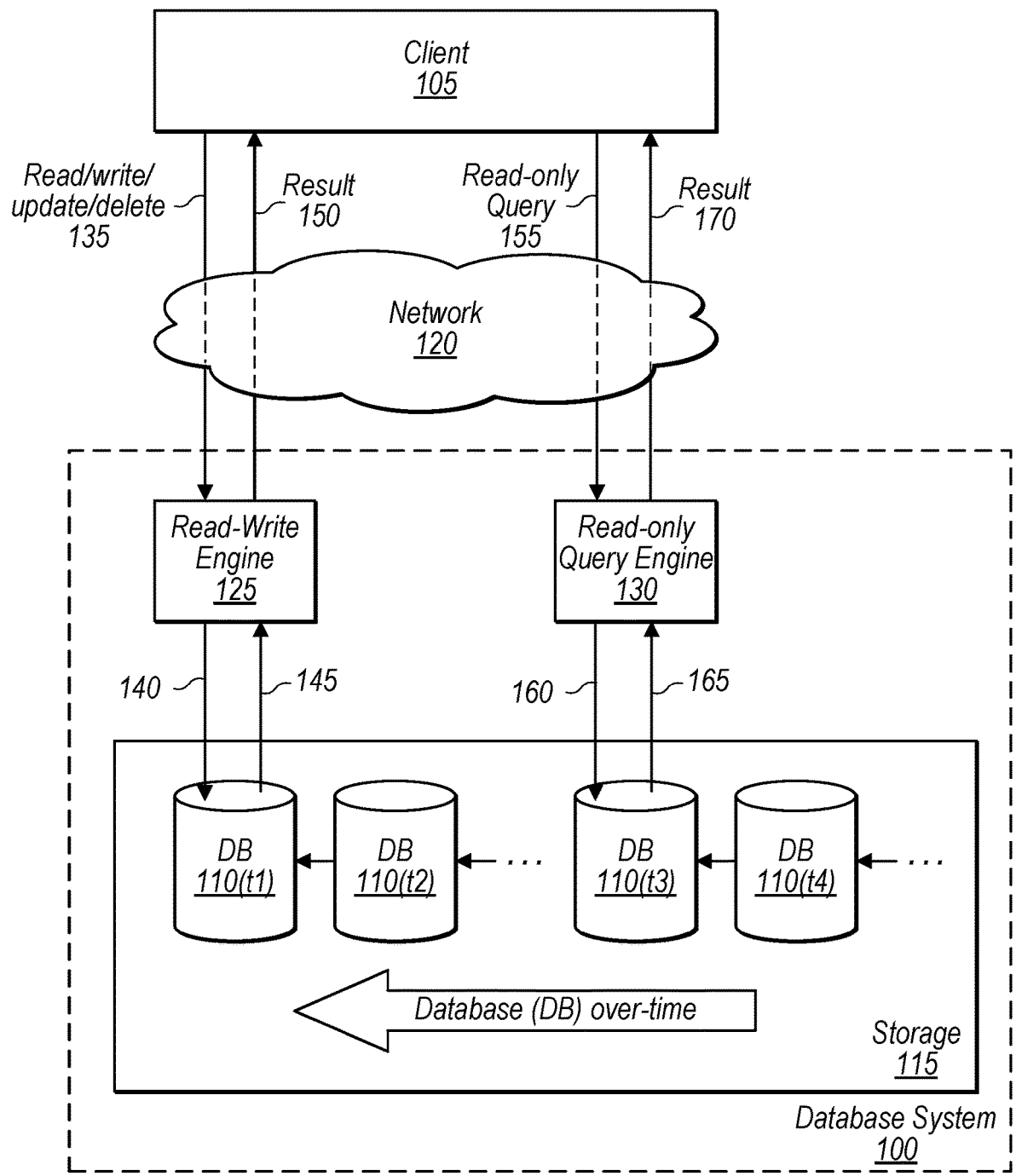
FIG. 1 is a block diagram illustrating the performance of read-only queries associated with points-in-time on a database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques for implementing read-on queries of a database are described. In some embodiments, a database system may include a read-only query network endpoint that may refresh manually in response to requests from a client or automatically based on a refresh rate. In some embodiments, a network endpoint may be one or more network-connected devices or nodes of a database system (e.g., a modem, switch, computer or server) which may accept communications to allow network-based accesses to a database. For instance, the request from the client may include an indication for refresh of the read-only query network endpoint; or the endpoint may be scheduled to refresh based on a periodical interval, e.g., every one hour. The refresh may be further associated with a specified point-in-time. When a refresh occurs, the read-only query network endpoints may cause the database system (e.g., through a control plane or other management components) to add a read-only query engine to the database system, which may attach to a read-only replica of the database that may represent a version of the database at the specified point-in-time. The read-only query network endpoint may accept read-only queries associated with the specified point-in-time. For instance, the read-only queries may include timestamps specifying the point-in-time. The read-only queries received at the read-only query network endpoint may be directed to the read-only query engine. The read-only query engine may perform queries on the read-only replica of the database, retrieve requested data and return results to the client. In some embodiments, the point-in-time may be specified in the read-only queries instead of being associated with the refresh. In that case, the read-only replica may be created in response to receiving the read-only queries at (rather than a refresh of) the read-only query network endpoint. Similarly, the read-only query engine may perform queries on the read-only replica and return results for the queries. Upon completion of the query or lapse of a specified duration, the database system may remove the read-only query engine and/or read-only replica of the database. In some embodiments, the specified points-in-time may refer to a current time. In some embodiments, the specified points-in-time may refer to a point-in-time prior to the current time. In some embodiments, the specified point-in-time may point to a future point-in-time with respect to the current time. In some embodiments, the queries may specify a future point-in-time based on a delay from the current time. Compared to traditional approaches, the techniques disclosed herein can offload point-in-time read-only queries to one or more dedicated read-only query engines. This can greatly reduce burdens on the database system and improve the efficiency of read-write operations.

In some embodiments, the database system may receive read-only queries associated with points-in-time via a database application program interface (API). For instance, in a database console, a client may submit a read-only query to the DBMS of a database (e.g., through a server of the DBMS). The read-only query may include a timestamp specifying a point-in-time. The DBMS (or the server) may include an API interface, and in response to receiving the point-in-time read-only query, may invoke an API call to instruct the database system to add a read-only query engine to the database system and create a read-only replica of the database that may represent a version of the database at the specified point-in-time. The read-only query engine may be attached to the read-only replica of the database such that the read-only query engine may perform the point-in-time query on the read-only replica of the database, retrieve data and return a result for the query. Upon completion of the query or at a determined time, the API may be executed to remove the read-only query engine and/or read-only replica of the database. In some embodiments, the read-only query may specify a point-in-time of the current time, a point-in-time prior to the current time, a future point-in-time with respect to the current time, or a future point-in-time based on a specified delay from the current time.

In some embodiments, the database system may receive a connection request, for instance, a SQL connection string via a database proxy, from a client. In response to the connection request, a read-only query engine may be added to the database system. In some embodiments, the connection request may further specify a point-in-time, and the database system may create a read-only replica of the database representing a version of the database at the specified point-in-time. The database system may accept read-only queries associated with the specified point-in-time. The database system may direct the read-only queries to the read-only query engine, which may in turn perform the queries on the read-only replica, retrieve data and return results for the queries. In some embodiments, the point-in-time may be specified in the read-only queries rather than the connection request. In that case, the database system may create the read-only replica of the database in response to receiving the read-only queries, which may be attached to the read-only query engine. The read-only query engine may then perform queries on the read-only replica and return results for the queries. Upon completion of the query or lapse of a specified duration, the database system may remove the read-only query engine and/or read-only replica of the database. In some embodiments, the read-only queries may specify a point-in-time of the current time, a point-in-time prior to the current time, a future point-in-time with respect to the current time, or a future point-in-time based on a specified delay after the current time.

FIG. 1 illustrates the performance of read-only queries associated with points-in-time on a database, according to some embodiments. As shown in FIG. 1, client 105 may communicate with database system 100 including database 110 that is stored on storage resource 115 through network 120. Database 110 may include one or more items such as tables, XML documents, JSON files, etc. Storage resource 115 may be implemented by one or more computing devices having processors and memory. Storage resource 115 may be implemented locally or on-premise with client 105, or remotely such as on a cloud service spanning one or more geographic locations. Client 105 may access database 110 from storage resource 115 through network 120, such as a local area network (LAN), a wide area network (WAN), or other types of area networks, via wired and/or wireless connections. Database 110 may undergo various modifications (or transactions) such as creation, addition, deletion and update of the one or more items. In FIG. 1, symbols t1, t2, t3 and t4 may refer to different points-in-time. For instance, t1 may refer to a current time, while t2-t4 may represent specific points-in-time prior to the current time, in this example. Database system 100 may commit one or more transactions on database 110 between the points-in-time t4 and t3. Accordingly, database 110 may evolve from a version at point-in-time t4 (e.g., 110(t4)) into a new version at point-in-time t3 (e.g., 110(t3)). Over time, database 110 may continuously advance through different versions, each corresponding to a specific point-in-time, and finally into the current version 110(t1) at the current time.

Database system 100 may include a database management system (DBMS) allowing users to define, create, maintain and control access to database 110. In some embodiments, the DBMS may include read-write engine 125 and read-only query engine 130. Read-write engine 125 may accept and perform various operations for client 105 (e.g., read, write, update and/or delete) on the current version of database 110 at the current time (i.e., on the current version 110(t1) at current time 8:00 a.m.), while read-only query engine 130 may implement read-only queries associated with a specified point-in-time on database 110 (e.g., on the version of database 110(t3) corresponding to the specified point-in-time t3 at 5:00 a.m.). For instance, read-write engine 125 of database 110 may receive various requests 135, such as a read query, a write or insert request, an update request, and/or a delete request, from client 105. When requests 135 include a read query, read-write engine 125 may send read data request 140 to database 110(t1) that is the current version of database 110 at the current time t1, retrieve data 145 from database 110(t1) and return result 150 (e.g., the requested data) to client 105. Conversely, when requests 135 include a transaction (e.g., write, update, and/or delete), read-write engine 125 may apply transaction 140 on database 110(t1), receive acknowledgement response 145, and return result 150 (e.g., an acknowledgement response) to client 105.

Unlike read-write engine 125, read-only query engine 130 may accept and implement only read-only queries associated with points-in-time on database 110. In some embodiments, read-only query engine 130 may accept read-only query 155 that may include a timestamp specifying a point-in-time, e.g., t3. In response to receiving read-only query 155, read-only query engine 130 may perform query 160 on a read-only replica of database 110 representing a version of database 110 at the specified point-in-time, e.g., 110(t3), retrieve data 165 and return result 170 to client 105. For purposes of illustration, FIG. 1 merely depicts the specified point-in-time t3 prior to the current time t1. In some embodiments, read-only query engine 130 may perform read-only queries directed to the current time (e.g., 8:00 a.m.) or a future point-in-time with respect to the current time (e.g., 9:00 a.m.).

Figure 2:
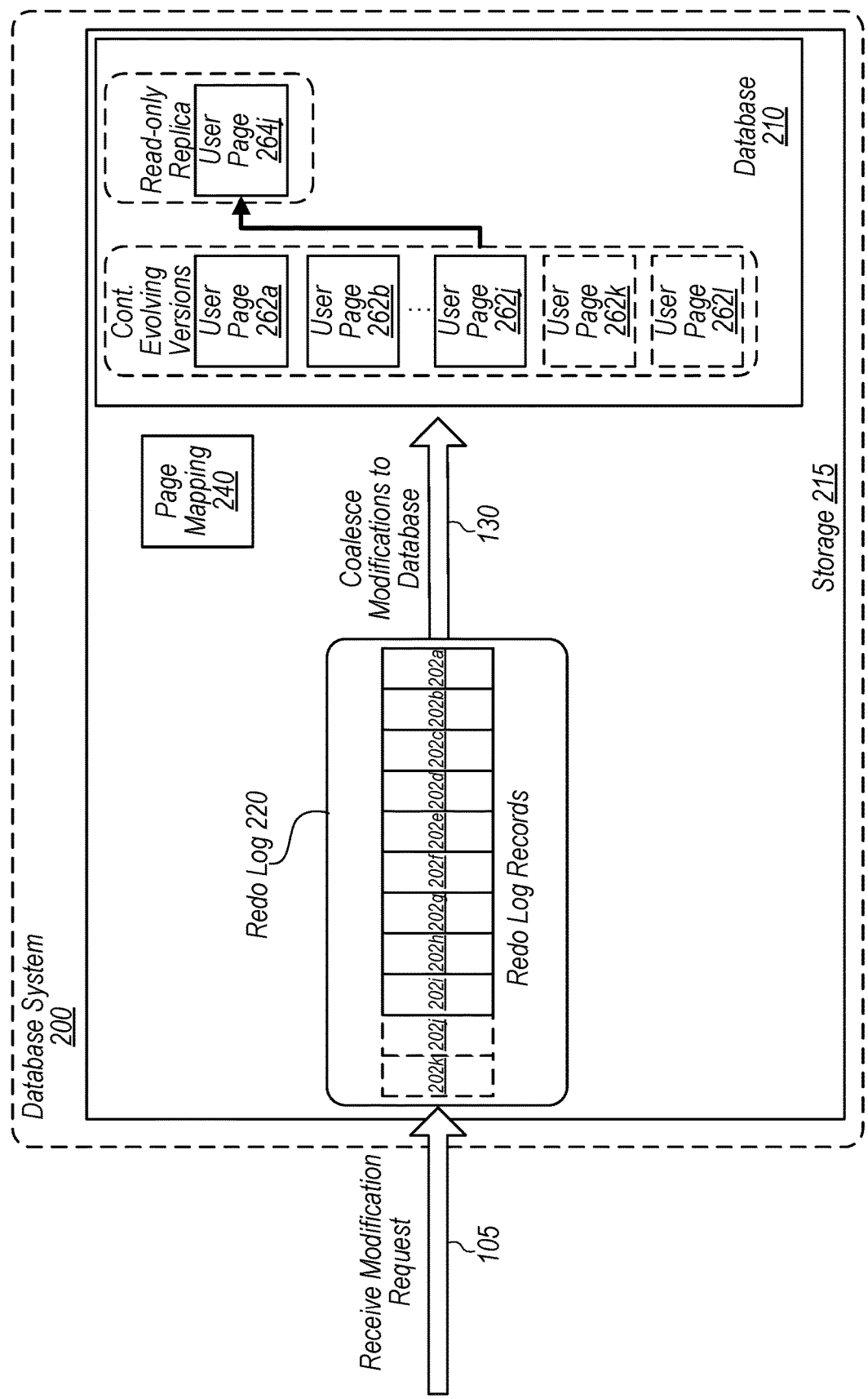
FIG. 2 is a block diagram illustrating an example process for committing transactions on a database, according to some embodiments.

FIG. 2 is a block diagram illustrating an example process for committing transactions on a database, according to some embodiments. In FIG. 2, database system 200 may receive request 205 to modify database 210 of database system 200 stored on storage resource 215. When database system 200 modifies database 210, database system 200 may generally generate and maintain redo log 220 on storage resource 215. Redo log 200 may include one or more redo log records 202a-202k, each corresponding to a requested modification and consisting of the difference between the after-image and before-image of database 210 associated with the modification. Page mapping 240 may identify the locations of the data requested to be modified (e.g., user page 262), so that when a request to access user page 262a is received, page mapping 270 may be used for the page to be accessed. As indicated by 230, a redo log record (e.g., 202a-202i) may be applied to a before-image of database 210 to commit the transaction and produce an after-image of database 210. For instance, user page 262a may be overwritten according to redo log record 202a to commit the requested modification to produce new version 262b. Similarly, user page 262b may be overwritten in accordance with redo log record 202b to further create new version 262c. As redo log records 202a-202i get committed on database 210 in sequence, user page 262 may be continuously updated to evolve into current version 262j. In some embodiments, each log record may be assigned a log sequence number (LSN) that may be a monotonically increasing value generated by database system 200. Database system 200 may track the LSN of the latest-committed transaction and accordingly determine what transaction to be committed next or truncated (or eliminated) to ensure the contained data integrity of database 110.

In some embodiments, in response to receiving modification request 205, redo log 220 may be updated immediately to durably log the modification request and provide a quick response to the client. However, the actual modification on database 210 (e.g., updating of user page 262) may be deferred to storage resource 215 and implemented at an upcoming time. Thus, at a current time, database system 200 may still keep one or more prior versions of database 210 on storage resource 215, each corresponding to a prior point-in-time. For instance, database system 200 may receive modification request 205 for user page 262 at 6:00 a.m. and 7:00 a.m., respectively. Database system 200 may immediately log each modification request as a redo log record (e.g., 202j and 202k respectively) in redo log 220 and provide respective acknowledgement responses to the client. However, as storage resource 215 may perform actual modifications on database 210 asynchronously, the latest version of user page 262 at the current time 8:00 a.m. (e.g., user page 262j) may still be the version of user page 262 at 2:00 a.m. Thus, when database system 200 receives point-in-time read-only queries pointed to those still available versions, database system 200 may quickly create read-only replicas and attach a read-only query engine (e.g., read-only query engine 130 in FIG. 1) to the read-only replicas. For instance, at the current time 8:00 a.m., database system 200 may receive a read-only query specifying a point-in-time of 5:00 a.m. (before the modification received at 6:00 a.m. and logged by red log record 202j). In response, database system 200 may identify user page 262j as the corresponding version at the specified point-in-time (e.g., 5:00 a.m.), create a duplicate copy of user page 262j to produce read-only replica 264j, and instruct the read-only query engine to perform the point-in-time read-only query on read-only replica 264j. Read-only replica 264j may be frozen from subsequent updates—essentially preserving a snapshot of user page 262 at the specified point-in-time. Because user page 262j is readily available on storage resource 215, read-only replica 264j may be created significantly faster. Further, the read-only replica of database 210 may or may not be a copy of the entire database, and may include only the specific data item (e.g., user page 264j) that is requested to be queried at the specified point-in-time, according to some embodiments. In parallel, as storage resource 215 still maintains user page 262*j* (together with read-only replica 264*j*, as a common storage), storage resource 215 may continuously commit the modifications on user page 262*j* (according to redo log records 202*j* and 202*k*) and create new versions 262*k* and 262*l*. For purposes of illustration, FIG. 2 depicts only one read-only replica 264*j*. In some embodiments, database 210 may contains multiple read-only replicas (not shown) each corresponding to a version of database 210 at one specific point-in-time.

Figure 3:
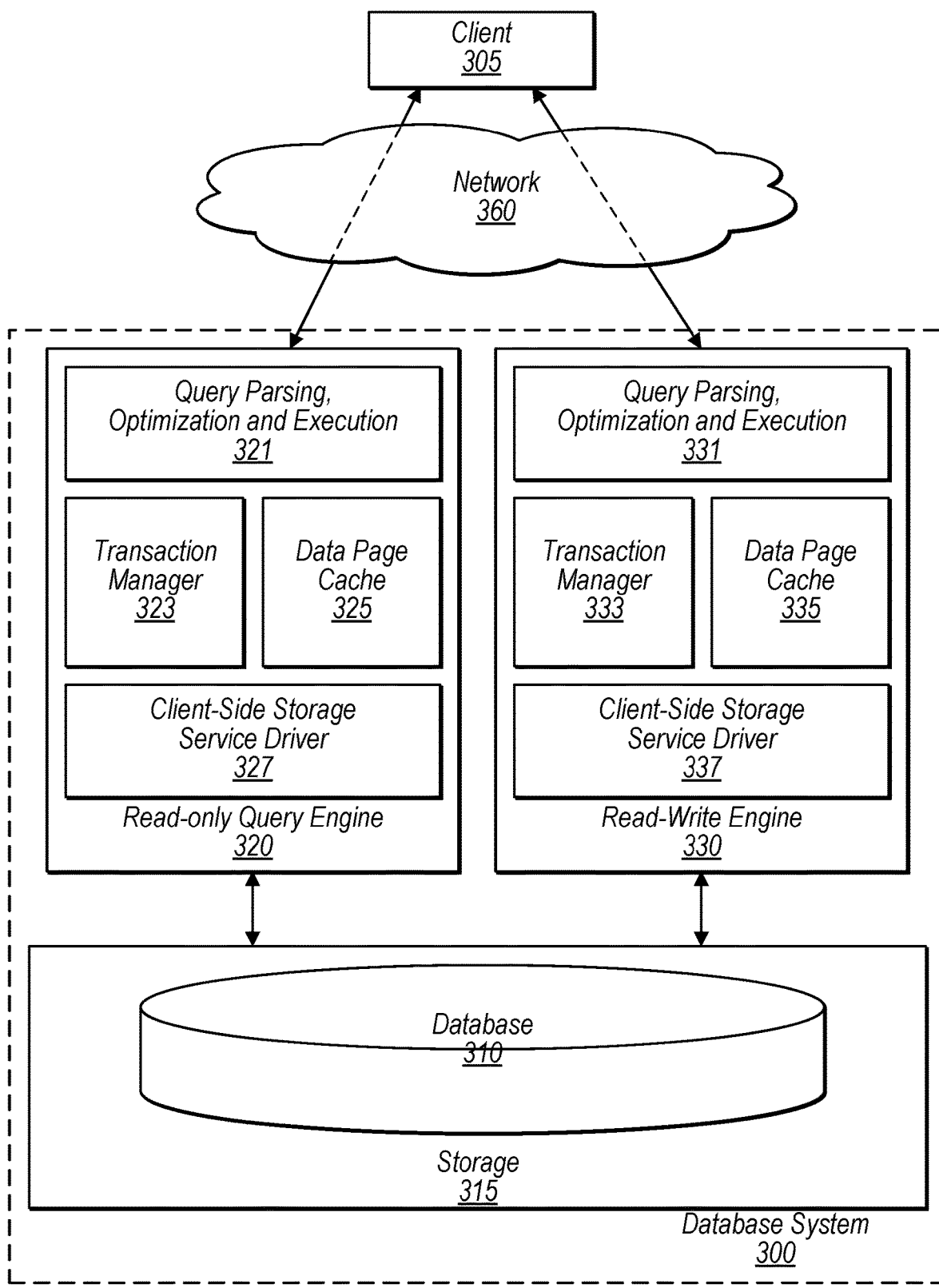
FIG. 3 is a block diagram illustrating various components of an example database system including a read-write engine and a read-only query engine, according to some embodiments.

FIG. 3 shows various components of an example database system that includes a read-write engine, a read-only query engine, and a distributed database storage service, according to some embodiments. In this example, database system 300 may include read-write engine 330 and read-only query engine 320 for performing operations on database 310 stored on storage resource 315. For purposes of illustration, FIG. 3 depicts only one storage resource 315. In some embodiments, storage resource 315 may be a distributed storage system including one or more storage resources (not shown) spanning multiple geographic locations (e.g., availability zones in one or different regions) to provide needed durability and resilience. Database 310 may contain one or more items such as tables, XML documents, JSON files, etc. As illustrated in this example, database client 305 may access read-write engine 330 and/or read-only query engine 320 via network 360 (e.g., read-write engine and read-only query engine 320 may be network-addressable and accessible to database client 305). Storage resource 315 may be employed by database system 300 to store data such as pages of one or more database tables (and redo log records and/or other metadata associated therewith) on behalf of clients 305 and to perform other functions on database 310 as described herein. For purposes of illustration, FIG. 3 depicts only one read-write engine 330 and one read-only query engine 320. Database system 300 may include multiple read-write engine 330 and/or multiple read-only query engine 320 (not shown) for individual clients 305 and/or database items.

In some embodiments, read-write engine 330 may include query parking, optimization, and execution component 331 to parse requests from client 305, optimize them, and develop an execution plan to carry out the associated database operations. In some embodiments, query parsing, optimization, and execution component 331 may return query responses to client 305, which may include write acknowledgements, requested data pages (or portions thereof), error messages, and or other responses, as appropriate. As illustrated in this example, read-write engine 330 may also include client-side storage service driver 337, which may route read requests and/or change notifications (e.g., redo log records) to storage resource 315, receive write acknowledgements from storage resource 315, receive requested data pages from storage resource 315, and/or return data pages, error messages, or other responses to query parsing, optimization, and execution component 331 (which may, in turn, return them to client 305). In some embodiments, read-write engine 330 may also include data page cache 335, in which data pages that were recently access (read and/or write) may be temporarily held. As illustrated in FIG. 3, read-write engine 330 may also include transaction manager 333, which may be responsible for providing transactionality and consistency in database 310 of which read-write engine 330 is a component. For example, transaction manager 333 may be responsible for ensuring the Atomicity, Consistency, and Isolation properties of database 310 and the transactions that are directed to database 310.

Besides the redo log, database system 300 may also maintain a undo log that may be accessed from storage resource 315. The undo log may be employed by transaction manager 333 to track the status of various transactions and roll back any locally cached results of transactions that do not commit. Read-write engine 330 may also maintain system metadata, such as one or more in-memory data structures, such as a data dictionary, transaction state information, or any other information for describing the data structure or schema of database 310. Other components, such as query parsing, optimization, and execution 331, transaction manager 333, and client-side storage service driver 337, may access in-memory system metadata in order to process queries, generate change notification messages, and/or any other system functions.

In some embodiments, read-only query engine 320 may also include components similar to those of read-write engine 330 but configured for read-only query operations, such as query parsing, optimization, and execution component 321, transaction manager 323, client-side storage service driver 327, as well as data page cache 325 and in-memory system metadata including in-memory data structures, such as a data dictionary, transaction state information, or any other information for describing the data structure or schema of the database. Read-only query 320 may have access to the redo log maintained at storage resource 315, based on which read-only query 320 may identify readily-available version of database 310 and create read-only replicas corresponding to one or more points-in-time, as described above.

Figure 4:
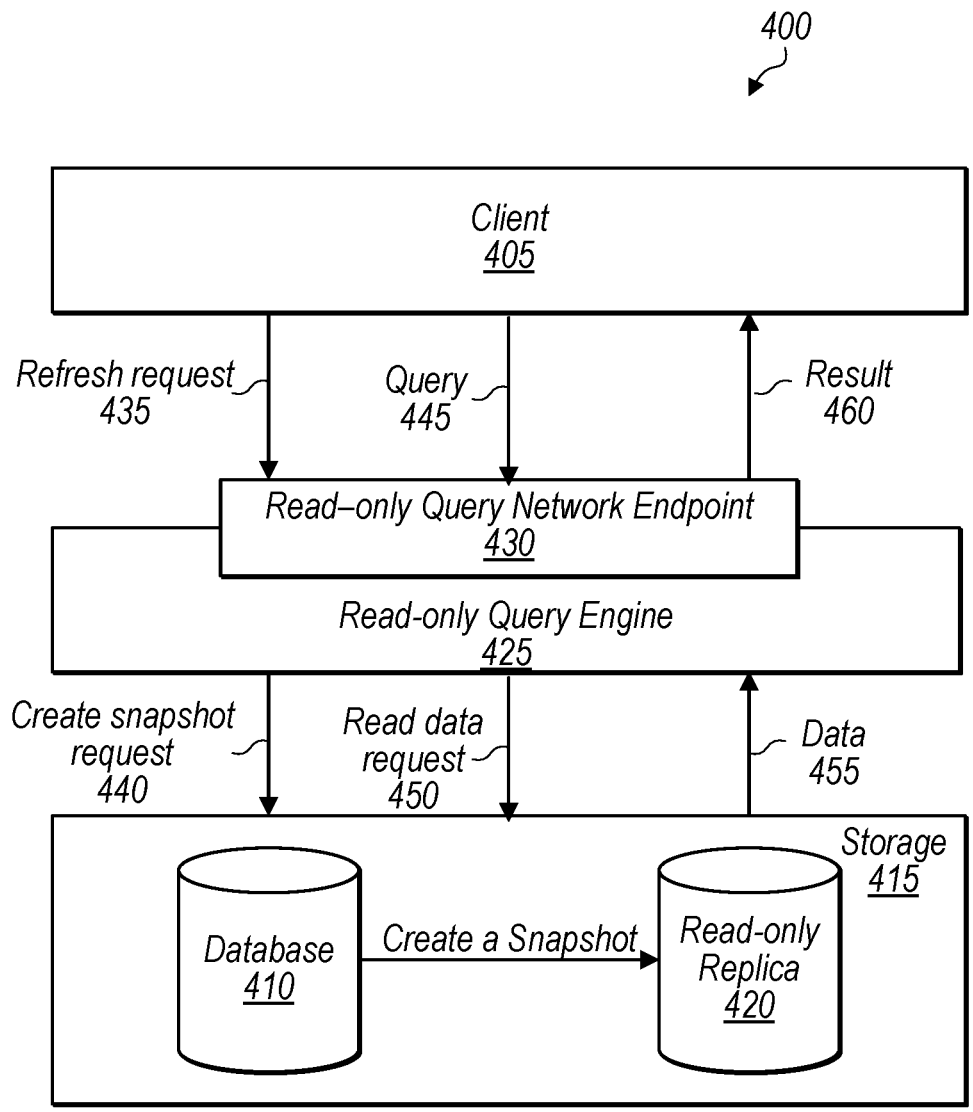
FIG. 4 is a block diagram illustrating an example network connection for implementing read-only queries associated with points-in-time on a database, according to some embodiments.

FIG. 4 shows an example network connection for implementing read-only queries associated with points-in-time on a database, according to some embodiments. As shown in FIG. 4, in some embodiments, a database system (e.g., database system 100/200/300 in FIGS. 1-3) may include one or more read-only query network endpoint 430 configured to accept read-only queries 435 from client 405. Read-only query network endpoint 430 may be network-addressable and accessible to client 405. In some embodiments, read-only query network endpoint 430 may refresh manually or automatically based on a refresh rate. For instance, client 405 may submit request 435 to read-only query network endpoint 430 including an indication for a refresh of read-only replica 420. Alternatively, the database system may set up read-only query network endpoint 430 to refresh read-only replica 420 automatically at a periodical interval, e.g., every one hour. In some embodiments, the refresh may be associated with a version of database 410 at a specified point-in-time. For instance, a refresh may update an existing read-only replica that represents one version of database 410 associated with one point-in-time with a new read-only replica that represents a new version of database 410 at another point-in-time. Alternatively, if no read-only replica exists yet, the refresh may cause the database system to create a read-only replica of database 410 corresponding to a point-in-time.

When a refresh occurs, the database system may add read-only query engine 425 the database system, create read-only replica 420 of database 410 that represents a version of database 410 at the specified point-in-time (as described above with respect to FIG. 2), and attach read-only query engine 425 to read-only replica 420, as indicated by 440. For instance, based on the redo log records in the redo log, read-only query engine 425 may quickly identify the version of database 410 still available on storage resource 415, which may correspond to the specified point-in-time. Read-only query engine 425 may create read-only replica 420 based on the identified version (e.g., making a duplicate copy) and then perform read-only queries associated with the point-in-time on read-only replica 420. In some embodiments, the point-in-time may not be associated with the refresh and instead specified in query 445. For instance, query 445, received at read-only query network endpoint 430, may include a timestamp specifying a point-in-time. In that case, read-only replica 420 may be created and assigned to read-only query engine 425 in response to receiving query 445.

Read-only query network endpoint 430 may direct query 445 to read-only query engine 425. Read-only query engine 425 may send read data request 450 to read-only replica 420, retrieve data 455, and return result 460 to client 405. If the requested data does not exist in read only replica 420, message 455 may represent an error message, and read-only query engine 425 may return result 460 to client 405. Upon completion of the performance of the query, the database system may remove read-only query engine 425 and/or read-only replica 420 to releases the associated storage resource from storage resource 415. In some embodiments, read-only query engine 425 and/or read-only replica 420 may be removed at a determined time or after lapse of a specified duration.

For purposes of illustration, FIG. 4 depicts only one read-only query network endpoint 430 directed to one read-only query engine 425. In some embodiments, the database system may equip multiple read-only query network endpoints 430 (not shown), directed to the same or different read-only query engines 425 (not shown) to increase the point-in-time read bandwidth of the database system. In addition, although FIG. 4 does not depict a read-write engine (e.g., read-write engine 125/330 in FIGS. 1 and 3), the database system may include a read-write engine configured to process read-write operations on database 410 (the current version of database 410). Thus, database 410 may continuously accept modifications and evolve into new version(s) after the specified point-in-time and in parallel to the performance of read-only queries by read-only query engine 425.

In some embodiments, read-only query 435 may specify a future point-in-time with respect to the current time where the future time has not yet occurred. In this way, query 435 may serve as a request scheduling the database system to, upon arrival of the specified future point-in-time, add read-only query engine 425, create read-only replica 420 at the specified point-in-time, perform queries on read-only replica 420, and return result 460 to client 405. For instance, if the current time is 8:00 a.m. and read-only query 435 specifies 10:15 a.m., then at 10:15 am read-only replica 420 may be created and attached with read-only query engine 425.

In some embodiments, query 435 may specify a delay. After the delay from the current time, the database system may automatically add read-only query engine 425 attached to read-only replica 420 at the corresponding future point-in-time, perform query on read-only replica 420, and return result 460 for query 435.

In some embodiments, query 435 may specify read-only query at a current time. In response, read-only query engine 425 may be added and attached to read-only replica 420 representing a current version of database 410. Read-only query engine 425 may perform query on read-only replica 420 and return a result for the query to client 405.

Figure 5:
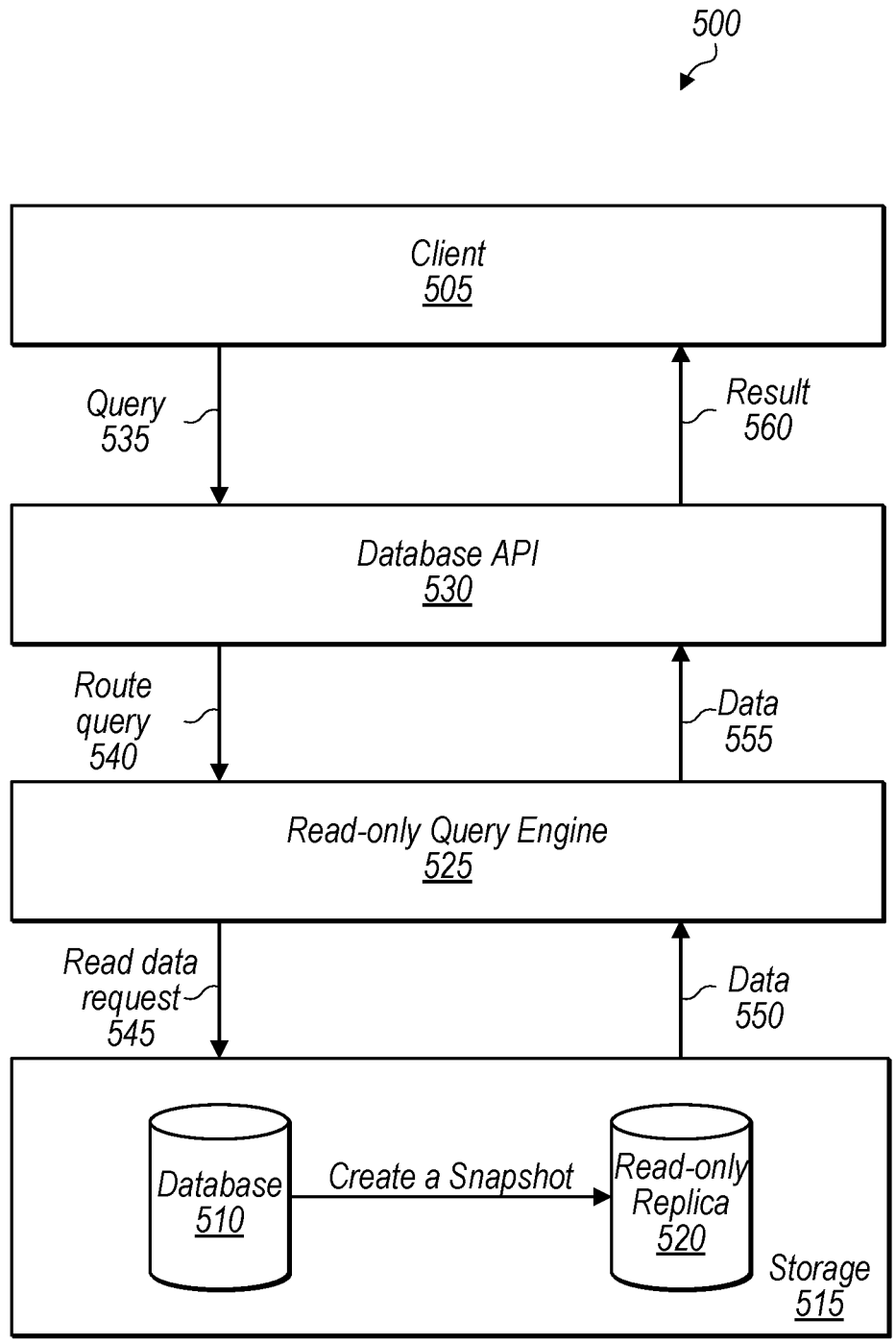
FIG. 5 is a block diagram illustrating another example network connection for implementing read-only queries associated with points-in-time on a database, according to some embodiments.

FIG. 5 shows another example network connection for implementing read-only queries associated with points-in-time on a database, according to some embodiments. In some embodiments, client 505 may submit read-only query 535 (e.g., in a database console) to the database system that may include database application program interface (API) 530. Read-only query 535 may include a timestamp specifying a point-in-time. In response to receiving query 535, the database system may invoke database API 530 to instantiate read-only query engine 525, create read-only replica 520 of database 510 which may represent a version of database 510 at the specified point-in-time, attach read-only query engine 525 to read-only replica 520, perform query 545 on read-only replica 520, and return result 550/555/560 to client 505. Database API 530 may cause the removal of read-only query engine 525 and/or read-only replica 520 from storage resource 515 upon completion of the query or lapse of a specified duration. In some embodiments, through database API 530, client 505 may also request read-only queries of database 510 corresponding to a current time, or read-only queries at a future time by specifying a prospective point-in-time or a delay from the current time, as discussed above with regards to FIG. 4. For purposes of illustration, FIG. 5 shows only one read-only query engine 525 attached to one read-only replica 520. In some embodiments, client 505 may submit a plurality of read-only queries 535 associated with points-in-time to the database system through database API 530, concurrently or near the same time. In response to the plurality of queries 535, the database system may add one or more read-only query engines 525, each attached to an individual one of one or more read-only replicas 520 of database 510. The one or more read-only replicas 520 may each correspond to a respective point-in-time specified in the plurality of read-only queries 535. The one or more read-only query engines 525 may perform query on their respective read-only replicas 520 and return a plurality of results 560 to client 505. Upon completion of the queries or at a determined time, the database system may remove the plurality of read-only query engines 525 and/or the one or more read-only replicas 520.

Figure 6:
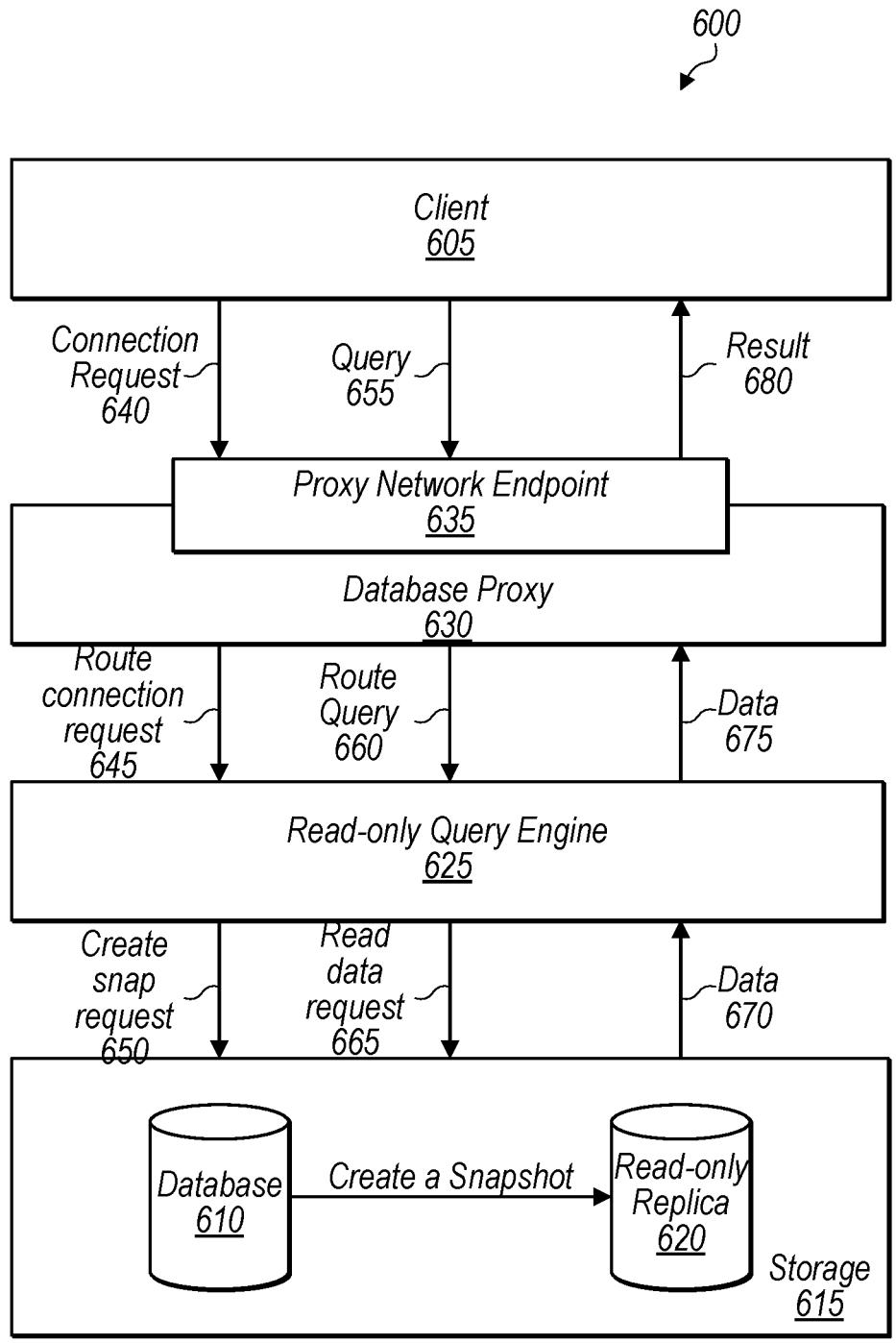
FIG. 6 is a block diagram illustrating another example network connection for implementing read-only queries associated with points-in-time on a database, according to some embodiments.

FIG. 6 shows another example network connection for implementing read-only queries associated with points-in-time on a database, according to some embodiments. In this example, client 605 may submit connection request 640 (e.g., a SQL connection string) to database proxy 630 of the database system. Database proxy 630 may be associated with a unique identifier and network-addressable via network-addressable proxy network endpoint 635. Connection request 640 may indicate a request for connection to a version of database 610 at a specified point-in-time.

In response to receiving connection request 640, data proxy 630 may instruct the database to add read-only query engine 625, create the version of database 610 at the specified point-in-time (e.g., read-only replica 620), and attached read-only query engine 625 to read-only replica 620 of database 610. Once the connection is established, client 605 may submit query 655 to database proxy 625, which may route query 660 to read-only query engine 625. Therefore, if connection request 640 does not specify a point-in-time, the point-in-time may also be specified in query 655 (e.g., by a timestamp), and the database may create read-only replica 620 in response to receiving query 655, according to some embodiments. Next, read-only query engine 625 may perform read data request 665 on read-only replica 620, retrieve data 670, return result 675/680 to client 605 via database proxy 630. Read-only query engine 625 and/or read-only replica 620 may be removed upon completion of the query or at a time duration. Similarly, in some embodiments, through database proxy 630, client 605 may also request read-only queries of database 510 corresponding to a current time, or read-only queries of the database at a future time by specifying a future point-in-time or a delay from the current time, as discussed above with regards to FIG. 4.

Although FIGS. 2-6 have been described and illustrated in the context of one database system, the various techniques and components illustrated and described in FIGS. 2-6 may be easily applied to other database systems or services that implement read-only query engines to perform queries. As such, FIGS. 2-6 are not intended to be limiting as to other embodiments of a system that may implement adding a read-only query engine to perform queries to a point-in-time of a write-accessible database. Various different systems and devices may implement the various methods and techniques described below, with regard to FIGS. 7-11, either singly or working together. For example, a service such as described below with regard to FIG. 11 or above with regard to FIGS. 1-2, may implement the various methods. Alternatively, a combination of different systems and devices that adds a read-only query engine to perform queries to a point-in-time of a write-accessible database. Therefore, the above examples and or any other systems or devices referenced as performing the illustrated method, are not intended to be limiting as to other different components, modules, systems, or configurations of systems and devices.

Figure 7:
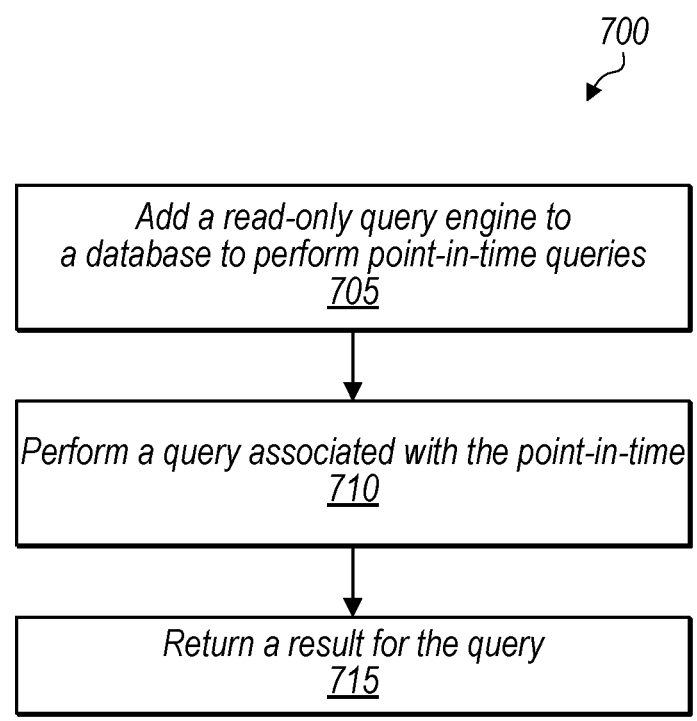
FIG. 7 is a flowchart illustrating an example process for implementing read-only queries associated with points-in-time on a database, according to some embodiments.

FIG. 7 is a flowchart illustrating an example process for implementing read-only queries associated with points-in-time on a database, according to some embodiments. In FIG. 7, process 700 may add a read-only query engine to a database system to perform queries on a version of a database at a point-in-time (block 705). The read-only query engine may be attached in response to requests, such as a manual request from a client indicating a refresh of a read-only query network endpoint (e.g., as described with regards to FIG. 4), a query associated with the point-in-time (e.g., as described with regards to FIG. 5), or a connection request to the version of the database at the point-in-time (e.g., as described with regards to FIG. 6). Besides the read-only query engine, the database system may also include a read-write engine that may continuously accept and perform modifications on the database after the point-in-time. The read-only query engine may perform a query on the version of the database, which may be determined to be associated with the point-in-time (block 710). Upon completion of the query, the read-only query engine may return a result for the query to the client (block 715).

Figure 8:
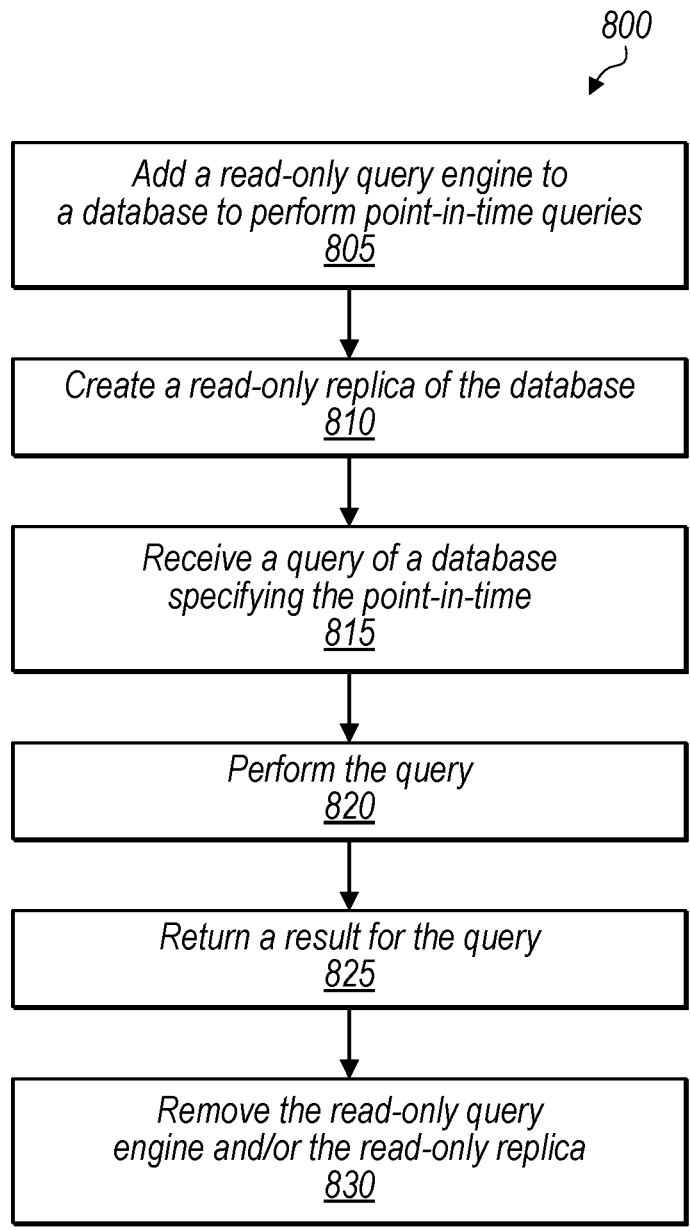
FIG. 8 is a flowchart illustrating another example process for implementing read-only queries associated with points-in-time on a database, according to some embodiments.

FIG. 8 is a flowchart illustrating another example process for implementing read-only queries associated with points-in-time on a database, according to some embodiments. In FIG. 8, process 800 may include adding a read-only query engine to a database system to perform point-in-time queries (block 805). In some embodiments, the read-only query engine may be added based on a refresh of a read-only query network endpoint directed to the read-only query engine. The refresh may occur in response to (1) a "manual" request from a client or (2) "automatically" based on a default or previously specified refresh rate, as described above in FIG. 4. The refresh may be configured to associate with a specified point-in-time. When a refresh occurs, the database system may add the read-only query engine and create a read-only replica of the database that may represent a version of the database at the specified point-in-time (block 810).

The database may receive a query of the database, e.g., at the read-only query network endpoint, which may include a timestamp specifying the point-in-time (block 815). The read-only query network endpoint may direct the query to the read-only query engine. The read-only query engine may perform a query to retrieve the requested data from the read-only replica (block 820). The read-only query engine may return a result for the query back to the client, e.g., via the read-only query network endpoint (block 825). Upon completion of the query or lapse of a specified duration, the read-only query engine and/or the read-only replica may be removed from the storage resource (block 830).

In some embodiments, the point-in-time may not be associated with the refresh, but instead specified in a query from the client to the read-only query network endpoint (block 815). In that case, once the read-only query engine is added (block 805), the database system may first receive the query specifying the point-in-time, e.g., via the read-only query network endpoint (block 815), and in response, create a read-only replica of the database corresponding to the specified point-in-time (block 810). The read-only query engine may then perform a query on the read-only replica (block 820).

The read-only query engine may return a result for the query to the client (block 825). Upon completion of the query or at a specified time, the read-only query engine and/or the read-only replica of the database may be removed from the storage resource (block 830).

In some embodiments, the point-in-time may refer to a current time (and thus the query is to read the current version of the database) or a future point-in-time. The future point-in-time may be specified, for instance, by a timestamp specifying the future point-in-time or based on a delay from the current time.

Figure 9:
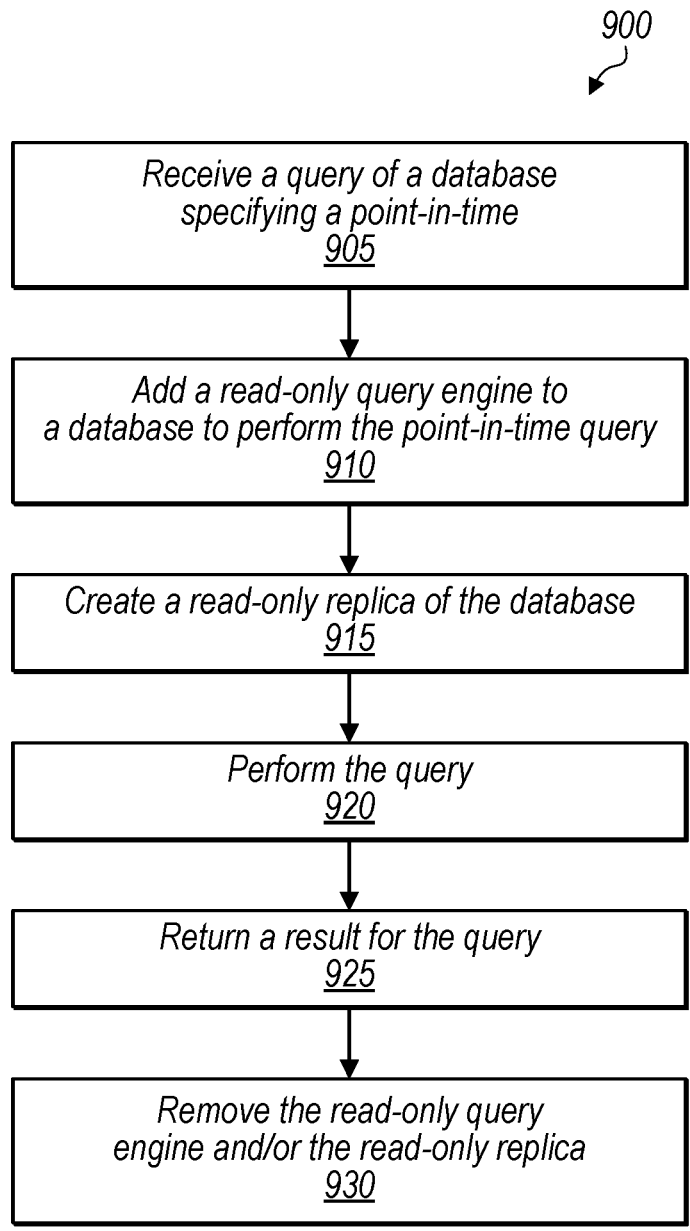
FIG. 9 is a flowchart illustrating another example process for implementing read-only queries associated with points-in-time on a database, according to some embodiments.

FIG. 9 is a flowchart illustrating another example process for implementing read-only queries associated with points-in-time on a database, according to some embodiments. In FIG. 9, process 900 may include receiving a query of a database that may include a timestamp specifying a point-in-time (block 905). For instance, the query may be received via a database API of the database, as described above with regards to FIG. 5. In response to receiving the query, a read-only query engine may be added to the database to perform the point-in-time query (block 910). The database system may create a read-only replica of the database at the specified point-in-time, and attach the read-only query engine to the read-only replica (block 915). The read-only-query engine may perform query on the read-only replica of the database (block 920) and return a result for the query (block 925). Upon completion of the query or at a specified time, the read-only query engine and/or the read-only replica may be removed from the storage resource (block 930). Similarly, the query may specify the point-in-time as the current time, a future point-in-time, or a delay from the current time.

Figure 10:
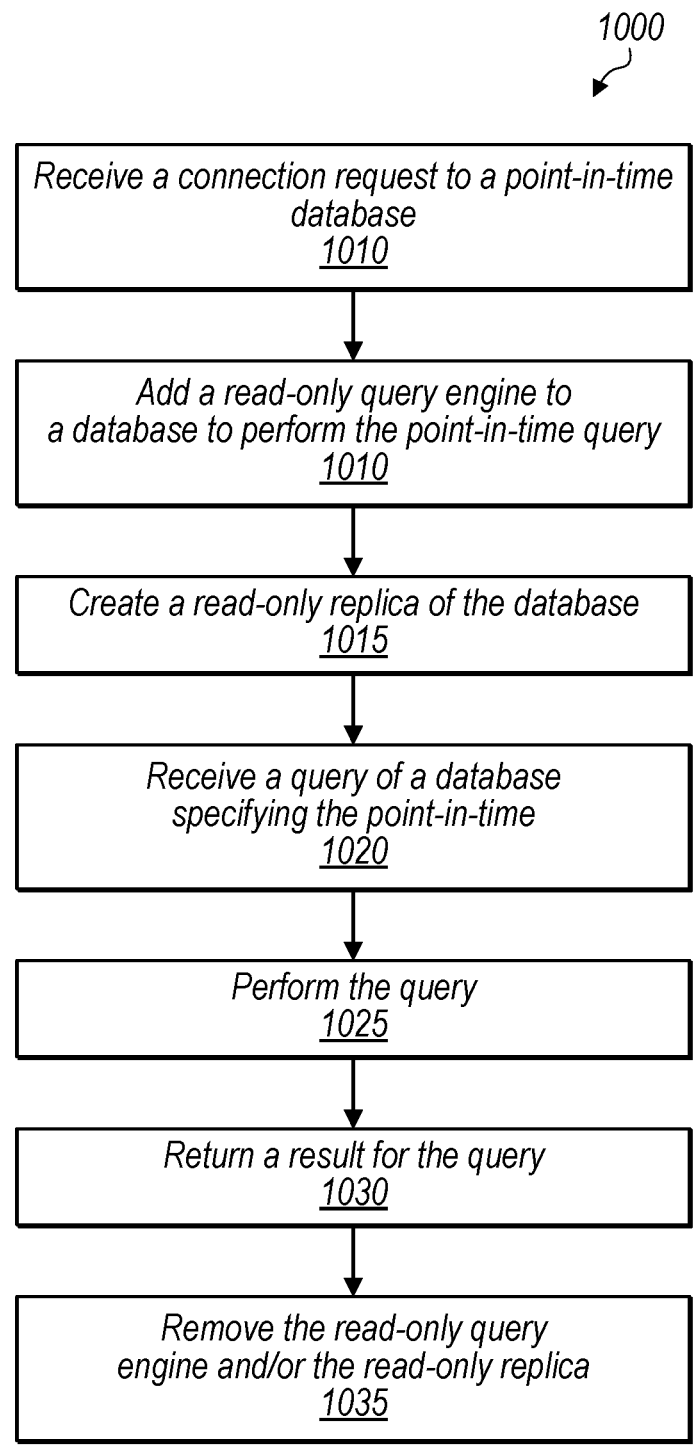
FIG. 10 is a flowchart illustrating another example process for implementing read-only queries associated with points-in-time on a database, according to some embodiments.

FIG. 10 is a flowchart illustrating another example process for implementing read-only queries associated with points-in-time on a database, according to some embodiments. In FIG. 10, process 1000 may include receiving a connection request to a version of a database corresponding to a specified point-in-time (block 1005). For instance, the connection request may include a SQL connection string to a database proxy of the database, as discussed above with regards to FIG. 6. In response to receiving the query, a read-only query engine may be added to the database to perform a point-in-time query (block 1010). The database system may create a read-only replica of the database at the specified point-in-time, and attach the read-only-query engine to the read-only replica (block 1015). Once the connection is established, the database system may receive a query that may include a timestamp specifying the point-in-time (block 1020). The read-only-query engine may perform query on the read-only replica of the database (block 1025) and return a result for the query (block 1030). Upon completion of the query or after a specified duration, the read-only query engine and/or the read-only replica of the database may be removed from the storage resource (block 935).

In some embodiments, the connection request may not specify a point-in-time, which may instead be specified in a query from the client (block 1020). In that case, once the read-only query engine is added in response to receiving a connection request (blocks 1005 and 1010), the database system may first receive the query that may include a timestamp specifying a point-in-time (block 1020), and in response, create a read-only replica of the database corresponding to the specified point-in-time (block 1015). The read-only-query engine may then perform query on the read-only replica of the database (block 1025) and return a result for the query (block 1030). Upon completion of the query or at a specified time, the read-only query engine and/or the read-only replica of the database may be removed from the storage resource (block 935).

Similarly, the point-in-time may refer to a current time (and thus the query is to read the current version of the database) or a future point-in-time. The future point-in-time may be specified, for instance, by a timestamp specifying the future point-in-time or based on a delay from the current time.

Figure 11:
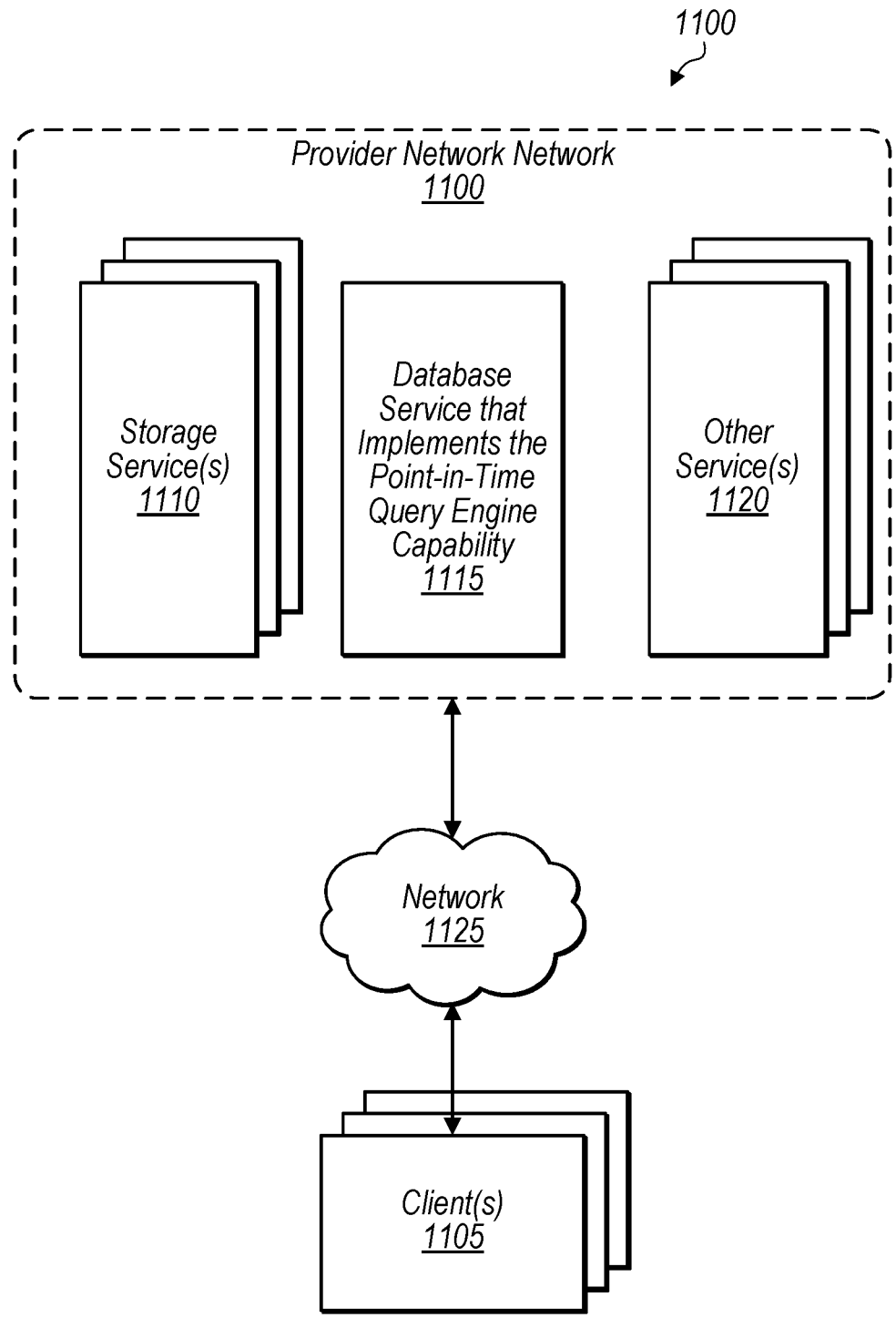
FIG. 11 is a block diagram illustrating an example of providing read-only queries associated with points-in-time on a database as a provider network service, according to some embodiments.

FIG. 11 is a block diagram illustrating an example of providing read-only queries associated with points-in-time on a database as a provider network service, according to some embodiments. In FIG. 11, provider network 1100 may be a private or closed system or may be set up by an entity such as a company or a public sector organization to provide one or more services (such as various types of cloud-based storage) accessible via the Internet and/or other networks to one or more client(s) 1105. Provider network 1100 may be implemented in a single location or may include numerous data centers hosting various resource pools, such as collections of physical and/or virtualized computer servers, storage devices, networking equipment and the like (e.g., computing system 1110 described below with regard to FIG. 11), needed to implement and distribute the infrastructure and storage services offered by provider network 1100. In some embodiments, provider network 1100 may implement various computing resources or services, such as a data storage service(s) 1110 (e.g., object storage services, block-based storage services, or data warehouse storage services), database service 1115 that implements the point-in-time query engine capability, as well as other service(s) 1120, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

Data storage service(s) 1110 may implement different types of data stores for storing, accessing, and managing data on behalf of client(s) 1105 as a network-based service that enables one or more client(s) 1105 to operate a data storage system in a cloud or network computing environment. For example, data storage service(s) 1110 may include various types of database storage services (both relational and non-relational) or data warehouses for storing, querying, and updating data. Such services may be enterprise-class database systems that are scalable and extensible. Queries may be directed to a database or data warehouse in data storage service(s) 1110 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 1110 may also include various kinds of object or file data stores for putting, updating, and getting data objects or files, which may include data files of unknown file type. Such data storage service(s) 1110 may be accessed via programmatic interfaces (e.g., APIs) or graphical user interfaces. Data storage service(s) 1110 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, data service that implements the point-in-time query engine capability 1115 may be provided by provider network 1100 as a network-based service to perform read-only queries associated with points-in-time on one or more databases of client(s) 1105. For instance, provider network 1100 may include a read-only query engine repository (or warm pool), in data storage service(s) 1110 or other service(s) 1120. The read-only query engine repository may store one or more pre-configured read-only query engine models, each representing a "template" read-only query engine (e.g., read-only query engines 130/320 in FIGS. 1 and 3), for various databases. Client(s) 1105 may send a request to provider network 1100 for database service 1115 that implements the point-in-time query engine capability through network 1125 to perform read-only queries associated with points-in-time on a database uploaded by client(s) 1105. The request may further provide one or more timestamps specifying the points-in-time. Upon receiving the request, database service 1115 that implements the point-in-time query engine capability may identify an appropriate read-only query engine model in the repository, instantiate a read-only query engine based on the identified model, add the read-only query engine to the database, create corresponding read-only replica(s) of the database, perform query using the read-only query engine and return results for the queries. Upon completion of the queries or at a specified time, read-only query service 1115 may remove the read-only query engine and/or read-only replica(s) of the database from storage service(s) 1110.

Other service(s) 1120 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage service(s) 1110. Various other distributed processing architectures and techniques may be implemented by data processing services (e.g., grid computing, sharding, distributed hashing, etc.). Note that in some embodiments, data processing operations may be implemented as part of data storage service(s) 1110 (e.g., query engines processing requests for specified data).

Generally speaking, client(s) 1105 may encompass any type of client configurable to submit network-based requests to provider network 1100 via network 1125, including requests for storage services (e.g., a request to create, read, write, obtain, or modify data in data storage service(s) 1110, a request to perform point-in-time read-only queries of database at database service 1115 that implements the point-in-time query engine capability, etc.). For example, a given client 1105 may include a suitable version of a web browser, or may include a plug-in module or other type of code module configured to execute as an extension to or within an execution environment provided by a web browser. Alternatively, a client 1105 may encompass an application such as a database application (or user interface thereof), a media application, an office application or any other application that may make use of storage resources in data storage service(s) 1110 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 1105 may be an application configured to interact directly with provider network 1100. In some embodiments, client(s) 1105 may be configured to generate network-based services requests according to a Representational State Transfer (REST)-style network-based services architecture, a document- or message-based network-based services architecture, or another suitable network-based services architecture.

In various embodiments, network 1125 may encompass any suitable combination of networking hardware and protocols necessary to establish network-based-based communications between client(s) 1105 and provider network 1100. For example, network 1125 may generally encompass the various telecommunications networks and service providers that collectively implement the Internet. Network 1125 may also include private networks such as local area networks (LANs) or wide area networks (WANs) as well as public or private wireless networks. For example, both a given client 1105 and provider network 1100 may be respectively provisioned within enterprises having their own internal networks. In such an embodiment, network 1125 may include the hardware (e.g., modems, routers, switches, load balancers, proxy servers, etc.) and software (e.g., protocol stacks, accounting software, firewall/security software, etc.) necessary to establish a networking link between given client 1105 and the Internet as well as between the Internet and provider network 1100. It is noted that in some embodiments, client(s) 1105 may communicate with provider network 1100 using a private network rather than the public Internet.

Figure 12:
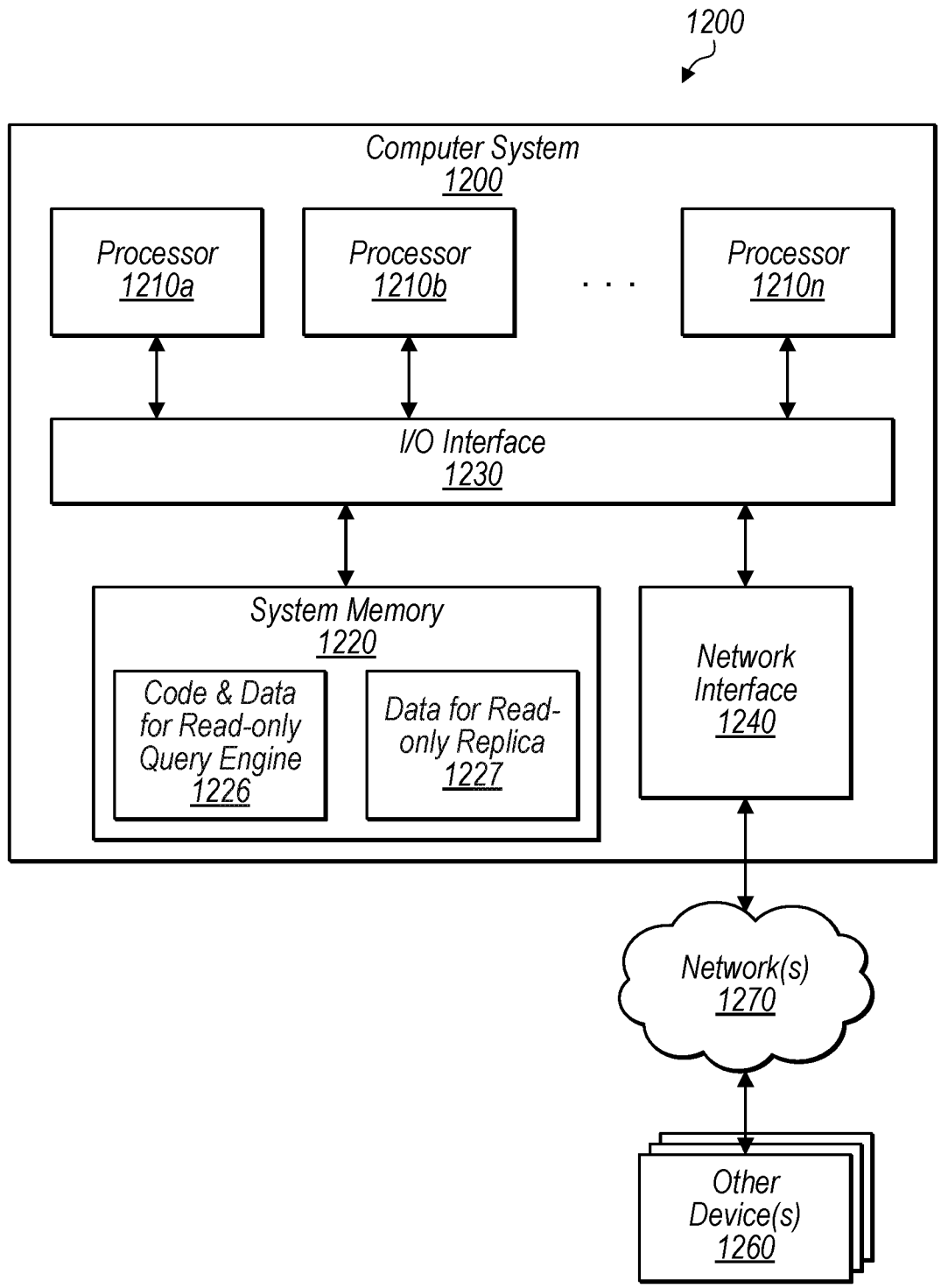
FIG. 12 is a block diagram an example computing system configured to implement the various methods, techniques and systems described herein, according to some embodiments.

The database system (e.g., database system 100/200/300 in FIGS. 1-3) and read-only query engine (e.g., read-only query engine 130/320 in FIGS. 1 and 3) described herein may in various embodiments be implemented by any combination of hardware and software, for instance, a computer system as in FIG. 12 that includes one or more processors executing program instructions stored on a computer-readable storage medium coupled to the processors. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be one embodiment of a computer-accessible medium configured to store instructions and data accessible by processor(s) 1210. In various embodiments, system memory 1220 may be implemented using any non-transitory storage media or memory media, such as magnetic or optical media, e.g., disk or DVD/CD coupled to computer system 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240. In the illustrated embodiment, program instructions (e.g., code) and data implementing one or more desired functions, such as read-only query engine and read-only replica of a database as code & data 1226 and data 1227, respectively.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached 20) through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as read-only query engine and read-only replica of a database as illustrated in FIGS. 1 through 10, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fiber Channel SANs, or via any other suitable type of network and/or protocol.

In some embodiments, system memory 1220 may be one embodiment of a computer-accessible medium configured to store program instructions and data as described above for FIGS. 1-10. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
    a plurality of nodes, respectively comprising one or more processors and a memory that implement a database service, wherein the plurality of nodes have separate, respective access over a network to a distributed data storage service that stores a database to perform to perform queries in parallel, and wherein the database service configured to:
        receive a read-only query that includes a timestamp that specifies a point-in-time for reading from a version of the database corresponding to the specified point-in-time, wherein the database service continued to accept modifications to the database and perform the modifications after the specified point-in-time;
        receive a second query to the database;
        perform, using a first one of the plurality of nodes assigned the read-only query, the read-only query that reads from the version of the database corresponding to the specific point-in-time, wherein the query reads data in the version of the database that was updated or deleted after the specific point in time;
        perform, using a second one of the plurality of nodes assigned the second query, the second query;
        return a result for the read-only query based on the data; and
        return a result for the second query.

2. The system of claim 1, wherein the distributed storage service is a common, separate storage service.

3. The system of claim 1, wherein the database service is a data warehouse service.

4. The system of claim 1, wherein the specified point in time is prior to a current time.

5. The system of claim 1, wherein the read-only query is performed by a query engine added from a pool of query engines maintained by the database service.

6. The system of claim 5, wherein the query engine is added from the pool responsive to a connection request from a client.

7. The system of claim 1, wherein the read-only query and the second query are received via a Structured Query Language (SQL) interface of the database service.

8. A method, comprising:
    receiving, at a database service, a read-only query that includes a timestamp that specifies a point-in-time for reading from a version of a database corresponding to the specified point-in-time, wherein the database service continued to accept modifications to the database and perform the modifications after the specified point-in-time, wherein the database service comprises a plurality of nodes that have separate, respective access to a distributed data storage service that stores the database to perform queries in parallel;
    receiving a second query to the database;
    performing, using a first one of the plurality of nodes assigned the read-only query by the database service, the read-only query that reads from the version of the database corresponding to the specific point-in-time, wherein the query reads data in the version of the database that was updated or deleted after the specific point in time;
    performing, using a second one of the plurality of nodes assigned the second query, the second query;
    returning, by the database service, a result for the read-only query based on the data; and
    returning, by the database service, a result for the second query.

9. The method of claim 8, wherein the distributed storage service is a common, separate storage service.

10. The method of claim 8, wherein the database service is a data warehouse service.

11. The method of claim 8, wherein the specified point in time is prior to a current time.

12. The method of claim 8, wherein the read-only query is performed by a query engine added from a pool of query engines maintained by the database service.

13. The method of claim 12, wherein the query engine is added from the pool responsive to a connection request from a client.

14. The method of claim 8, wherein the read-only query and the second query are received via a Structured Query Language (SQL) interface of the database service.

15. One or more non-transitory computer-readable storage media storing program instructions that, when executed on or across one or more computing devices, cause the one or more computing devices to implement:
    receiving, at a database service, a read-only query that includes a timestamp that specifies a point-in-time for reading from a version of a database corresponding to the specified point-in-time, wherein the database service continued to accept modifications to the database and perform the modifications after the specified point-in-time, wherein the database service comprises a plurality of nodes that have separate, respective access to a distributed data storage service that stores the database to perform to perform queries in parallel;

receiving, at the database service, a second query to the database;

performing, using a first one of the plurality of nodes assigned the read-only query by the database service, the read-only query that reads from the version of the database corresponding to the specific point-in-time, wherein the query reads data in the version of the database that was updated or deleted after the specific point in time;

performing, using a second one of the plurality of nodes assigned the second query, the second query;

returning, by the database service, a result for the read-only query based on the data; and returning, by the database service, a result for the second query.

16. The one or more non-transitory computer-readable storage media of claim 15, wherein the database service is a data warehouse service.

17. The one or more non-transitory computer-readable storage media of claim 15, wherein the specified point in time is prior to a current time.

18. The one or more non-transitory computer-readable storage media of claim 15, wherein the read-only query is performed by a query engine added from a pool of query engines maintained by the database service.

19. The one or more non-transitory computer-readable storage media of claim 18, wherein the query engine is added from the pool responsive to a connection request from a client.

20. The one or more non-transitory computer-readable storage media of claim 15, wherein the read-only query and the second query are received via a Structured Query Language (SQL) interface of the database service.

* * * * *